(12) United States Patent
Watson et al.

(10) Patent No.: US 11,776,572 B2
(45) Date of Patent: Oct. 3, 2023

(54) MAGNETIC TAPE HAVING ALTERNATING SECTIONS FOR USE IN ULTRA-HIGH AREAL DENSITY TAPE STORAGE SYSTEMS

(71) Applicant: Western Digital Technologies, Inc., San Jose, CA (US)

(72) Inventors: Mark L. Watson, Boulder, CO (US); James N. Malina, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 73 days.

(21) Appl. No.: 17/455,120

(22) Filed: Nov. 16, 2021

(65) Prior Publication Data

US 2023/0154492 A1 May 18, 2023

(51) Int. Cl.
*G11B 5/78* (2006.01)
*G11B 5/008* (2006.01)

(52) U.S. Cl.
CPC ............ *G11B 5/78* (2013.01); *G11B 5/00817* (2013.01)

(58) Field of Classification Search
CPC .. G11B 5/64; G11B 5/65; G11B 5/627; G11B 5/78; G11B 5/00813; G11B 5/00817
See application file for complete search history.

(56) References Cited

U.S. PATENT DOCUMENTS

| | | |
|---|---|---|
| 6,587,298 B1 | 7/2003 | Yamada |
| 7,085,091 B1 * | 8/2006 | Kientz .................. G11B 15/52 |
| 7,086,623 B2 | 8/2006 | Sato et al. |
| 7,556,215 B2 | 7/2009 | Livermore et al. |
| 7,646,562 B2 | 1/2010 | Vanderheyden et al. |
| 7,835,103 B2 | 11/2010 | Anderson et al. |
| 7,940,496 B2 | 5/2011 | Vanderheyden |
| 8,014,102 B2 | 9/2011 | Kientz et al. |
| 8,773,805 B2 | 7/2014 | Argumedo et al. |

(Continued)

FOREIGN PATENT DOCUMENTS

JP 6113028 B2 4/2017

OTHER PUBLICATIONS

Hitachi, "50 TB Per Tape Cartridge: Japanese Researchers Develop Ultra High Capacity Tape Media", May 19, 2010, https://phys.org/news/2010-05-tb-tape-cartridge-japanese-ultra.html#google_vignette.

*Primary Examiner* — Holly Rickman
(74) *Attorney, Agent, or Firm* — PATTERSON + SHERIDAN, LLP; Steven H. VerSteeg (57) ABSTRACT

The present disclosure generally relates to a tape utilized with a tape drive including a tape head. The tape comprises a plurality of writeable portions configured to store data and a plurality of non-writeable portions that are unable to store data. The writeable portions comprise one or more materials selected from the group consisting of: Ru, Pt, Ta, and Co, and the non-writeable portions comprise a different material than the writeable portions. Each writeable portion is defined between two non-writeable portions, and each writeable portion has a greater area on the tape than each non-writeable portion. The non-writeable portions are utilized during stop-start and turn-around operations of the tape head, are configured to lubricate the tape head, clean the tape head, and remove debris from the tape head. The non-writeable portions enable improved performance of the tape drive while reducing a cost of the tape.

27 Claims, 8 Drawing Sheets

(56) References Cited

U.S. PATENT DOCUMENTS

| | | |
|---|---|---|
| 9,934,816 B1 | 4/2018 | Miyamura et al. |
| 10,424,329 B2 * | 9/2019 | Tachibana ................. G11B 5/78 |
| 11,386,925 B2 * | 7/2022 | Malina .................. G06F 3/0659 |
| 2009/0091856 A1 * | 4/2009 | Honda ............... G11B 5/00826 |
| | | 428/832 |

* cited by examiner

MAGNETIC TAPE HAVING ALTERNATING SECTIONS FOR USE IN ULTRA-HIGH AREAL DENSITY TAPE STORAGE SYSTEMS

BACKGROUND OF THE DISCLOSURE

Field of the Disclosure

Embodiments of the present disclosure generally relate to a tape utilized with a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

Often times, data is written to the magnetic media or tape in a serpentine fashion, where the tape moving over the tape head stops moving after the tape head writes a few data tracks of the tape, and then turns around to allow the tape head to continue writing adjacent data tracks of the tape. After writing the adjacent tracks, the tape stops once more and turns around to allow the tape head to write additional data tracks. As such, there are several areas on the tape where the tape head repeatedly stops and turns around about the tape. Such areas are more susceptible to damage, are often unusable to store data, and result in a decreased lifetime of the tape, as well as subjecting the tape head to increased wear.

Therefore, there is a need in the art for an improved tape to be utilized with a tape drive comprising a tape head.

SUMMARY OF THE DISCLOSURE

The present disclosure generally relates to a tape utilized with a tape drive including a tape head. The tape comprises a plurality of writeable portions configured to store data and a plurality of non-writeable portions that are unable to store data. The writeable portions comprise one or more materials selected from the group consisting of: Ru, Pt, Ta, and Co, and the non-writeable portions comprise a different material than the writeable portions. Each writeable portion is defined between two non-writeable portions, and each writeable portion has a greater area on the tape than each non-writeable portion. The non-writeable portions are utilized during stop-start and turn-around operations of the tape head, are configured to lubricate the tape head, clean the tape head, and remove debris from the tape head. The non-writeable portions enable improved performance of the tape drive while reducing a cost of the tape, and the surface characteristics of the non-writeable portions can be selected to mitigate stop-start stiction effects.

In one embodiment, a magnetic tape comprises a plurality of writeable portions comprising one or more materials selected from the group consisting of: Ru, Pt, Ta, Co, Ni, Fe, W, Cr, Ti, and Zr, the plurality of writeable portions being able to store data, and a plurality of non-writeable portions, each non-writeable portion being disposed adjacent to at least one writeable portion of the plurality of writeable portions, wherein the plurality of non-writeable portions and the plurality of writeable portions comprise different materials.

In another embodiment, a magnetic tape comprises a plurality of writeable portions comprising one or more materials selected from the group consisting of: Ru, Pt, Ta, Co, Ni, Fe, W, Cr, Ti, and Zr, the plurality of writeable portions being able to store data, wherein each writeable portion of the plurality of writeable portions has a first area, and a plurality of non-writeable portions, each non-writeable portion being disposed in contact with at least one writeable portion of the plurality of writeable portions, wherein: the plurality of non-writeable portions each has a second area, the first area is greater than the second area, and the plurality of non-writeable portions and the plurality of writeable portions comprise different materials.

In yet another embodiment, a magnetic tape comprises a plurality of writeable portions sputtered with a first coating comprising one or more materials selected from the group consisting of: Ru, Pt, Ta, Co, Ni, Fe, W, Cr, Ti, and Zr, the plurality of writeable portions being able to store data, and a plurality of non-writeable portions sputtered with a second coating comprising one or more materials selected from the group consisting of W, Be, Ti, Ta, Cr, and Si, wherein: the first coating and the second coating comprise different materials, the plurality of writeable portions and the plurality of non-writeable portions alternate along a total length of the magnetic tape, and the plurality of non-writeable portions are unable to store user data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape utilized with a tape drive including a tape head. The tape comprises a plurality of writeable portions configured to store data and a plurality of non-writeable portions that are unable to store data. The writeable portions comprise one or more materials selected from the group consisting of: Ru, Pt, Ta, and Co, and the non-writeable portions comprise a different material than the writeable portions. Each writeable portion is defined between two non-writeable portions, and each writeable portion has a greater area on the tape than each non-writeable portion. The non-writeable portions are utilized during stop-start and turn-around operations of the tape head, are configured to lubricate the tape head, clean the tape head, and remove debris from the tape head. The non-writeable portions enable improved performance of the tape drive while reducing a cost of the tape, and the surface characteristics of the non-writeable portions can be selected to mitigate stop-start stiction effects.

Figure 1A:
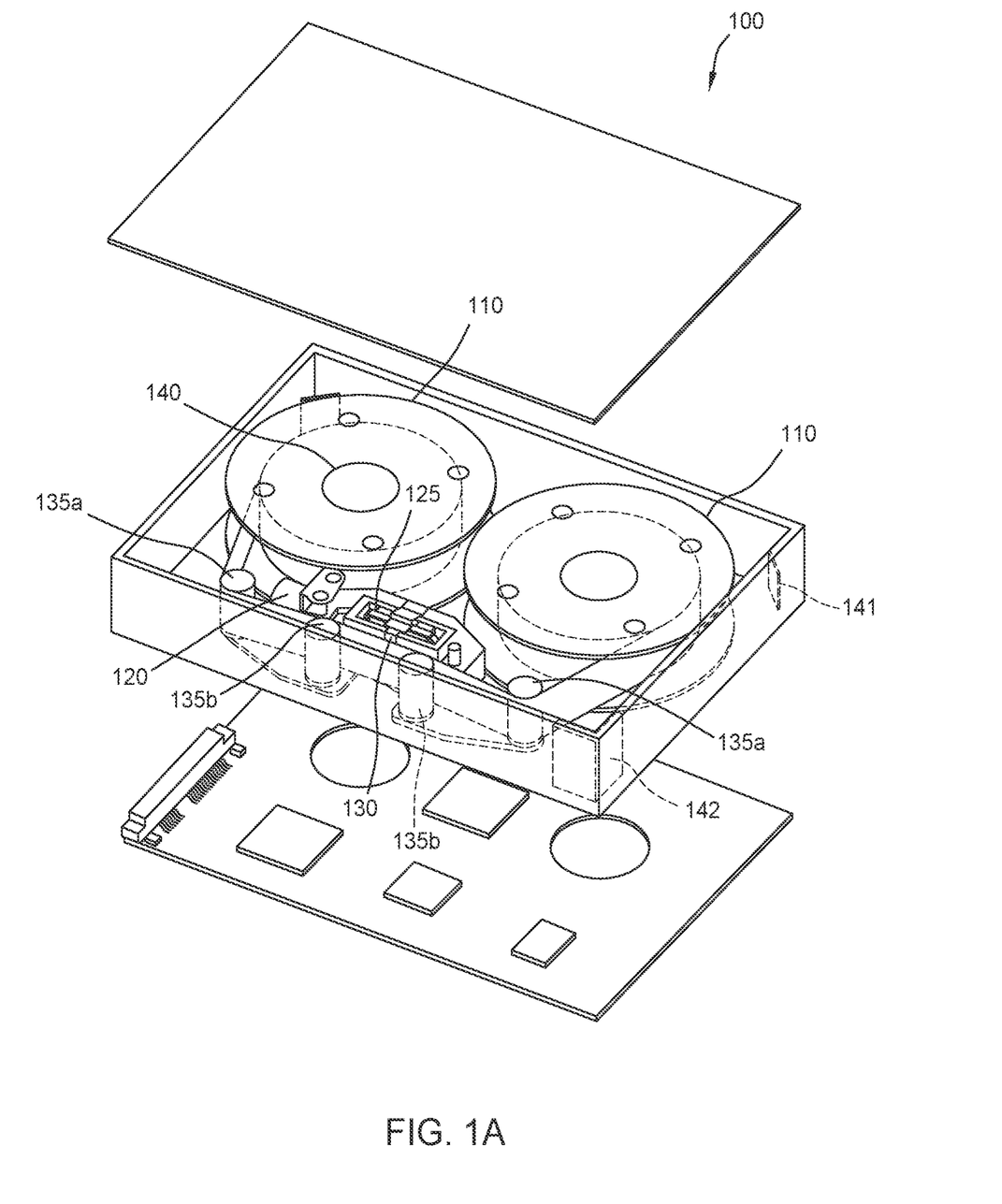
FIGS. 1A-1C illustrate a perspective exploded view, a simplified top down, and side profile view of a tape drive, in accordance with some embodiments.
Figure 1B:
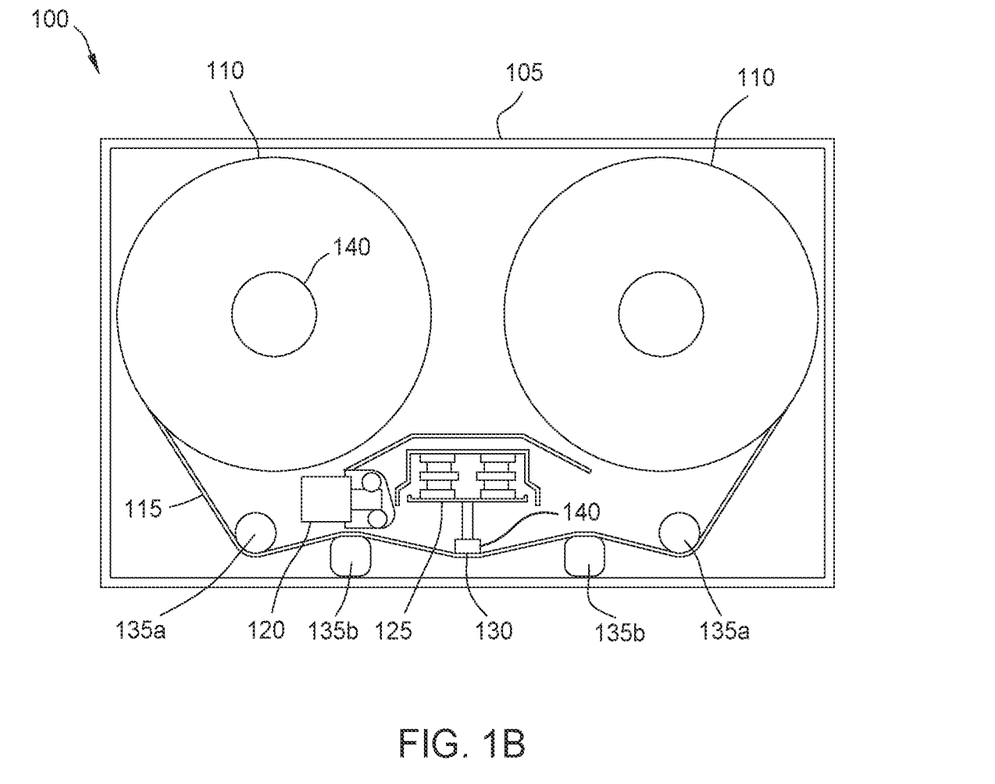
Figure 1C:
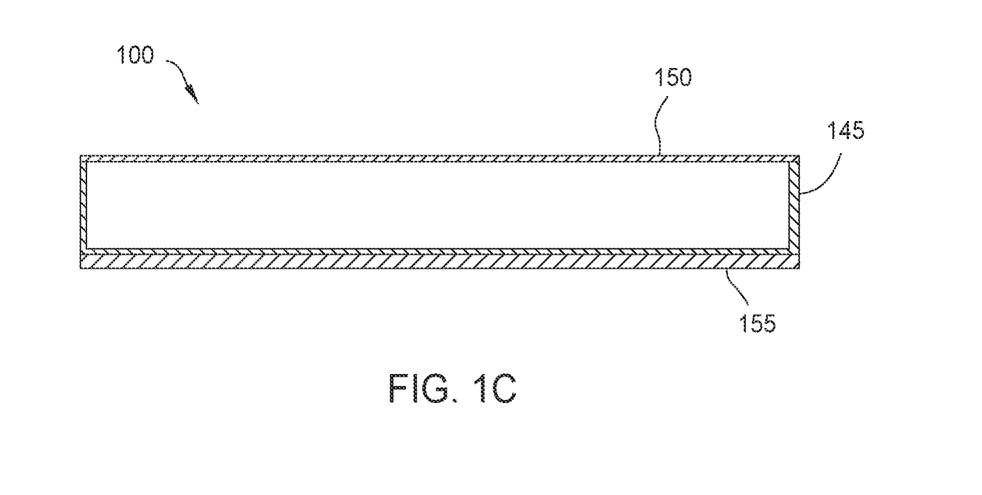

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.), a head assembly 130 with one or more read heads and one or more write heads, and tape guides/rollers 135a, 135b, and a controller 140 coupled to the head assembly 130. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises a base film, which can be PEN, PET, aramid or any similar plastic material, a magnetic recording layer on the front side of the tape media, and a back coat. The magnetic recording layer can be particulate in nature (e.g., barium ferrite or strontium ferrite particles, or metal particles), or fabricated using thin film sputtering techniques. The magnetic recording layer is the surface that can be magnetically manipulated (written to or read from) by one or more read/write heads. The back coat is applied to the reverse side of the base film to improve the mechanical characteristics of the tape media and aid in packing the tape 115 onto the tape reels and guide the tape 115 through the tape path components.

Tape media 115 from the tape reels 110 are biased against the guides/rollers 135a, 135b (collectively referred to as guides/rollers 135) and are movably passed over the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 2:
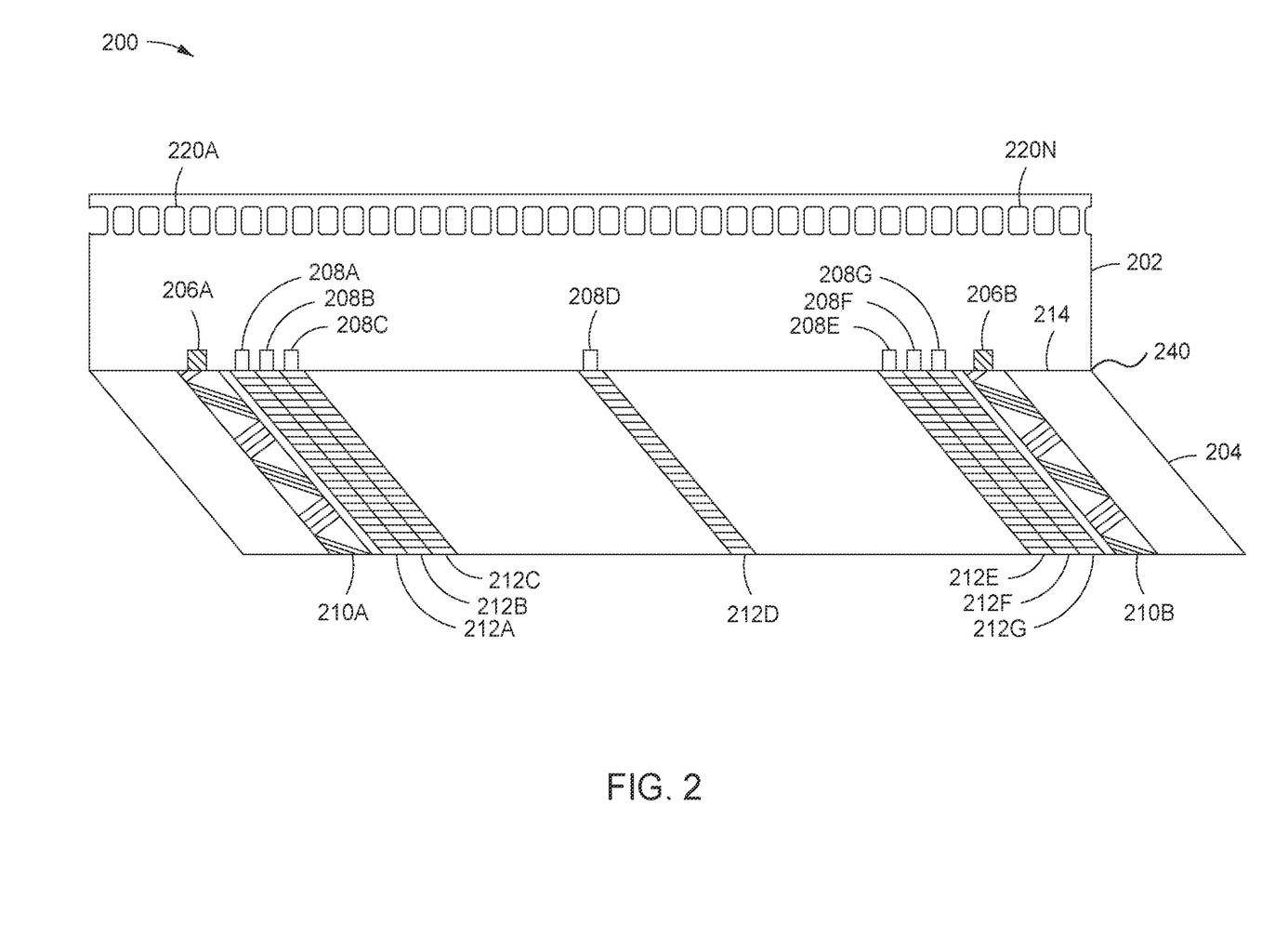
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204. The tape head module assembly 200 is coupled to a controller 240.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210␤. The combined information allows the servo actuator of the tape drive 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
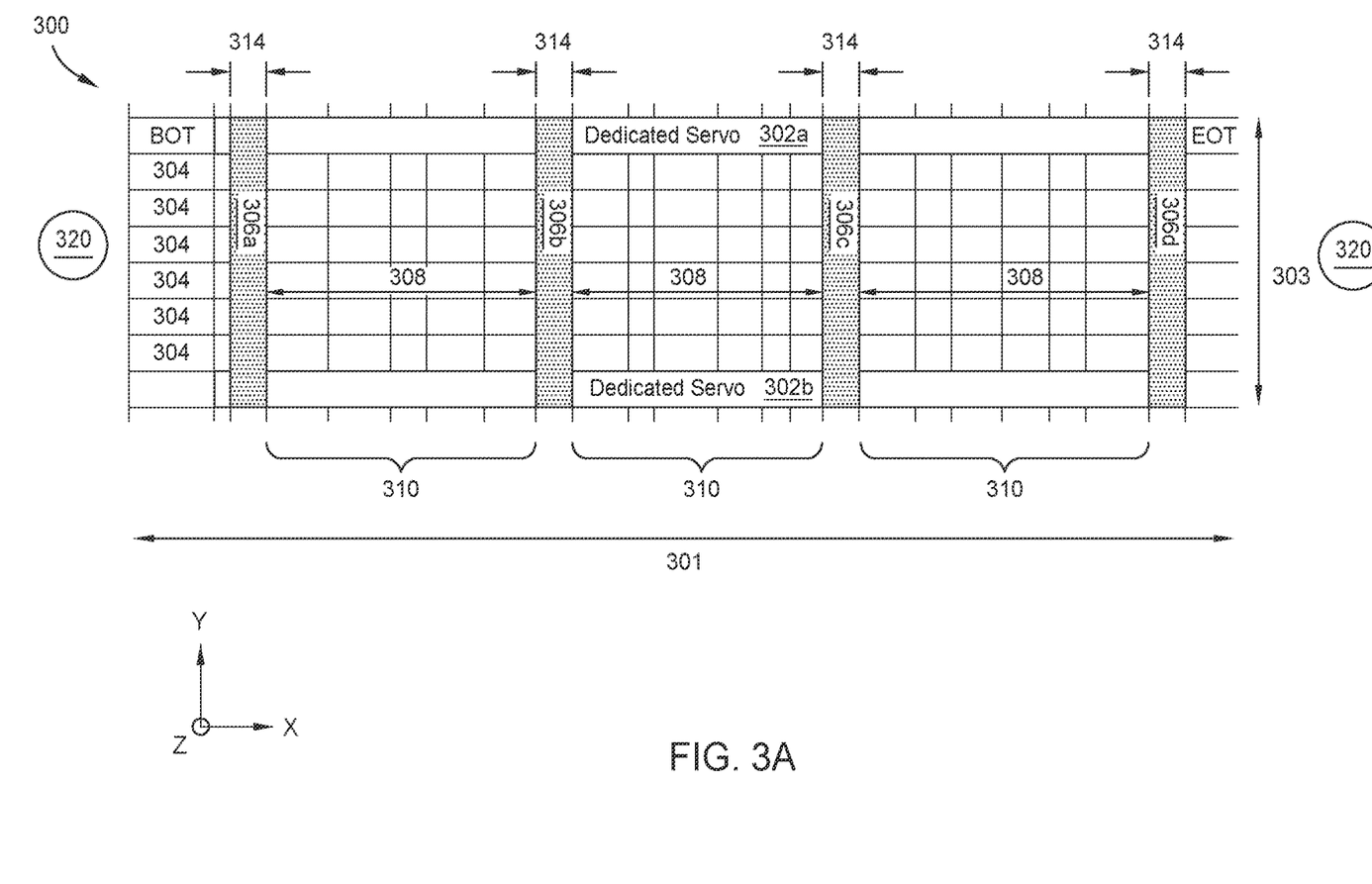
FIGS. 3A-3B illustrate a magnetic tape for use with a tape head of a tape drive, according to various embodiments.
Figure 3B:
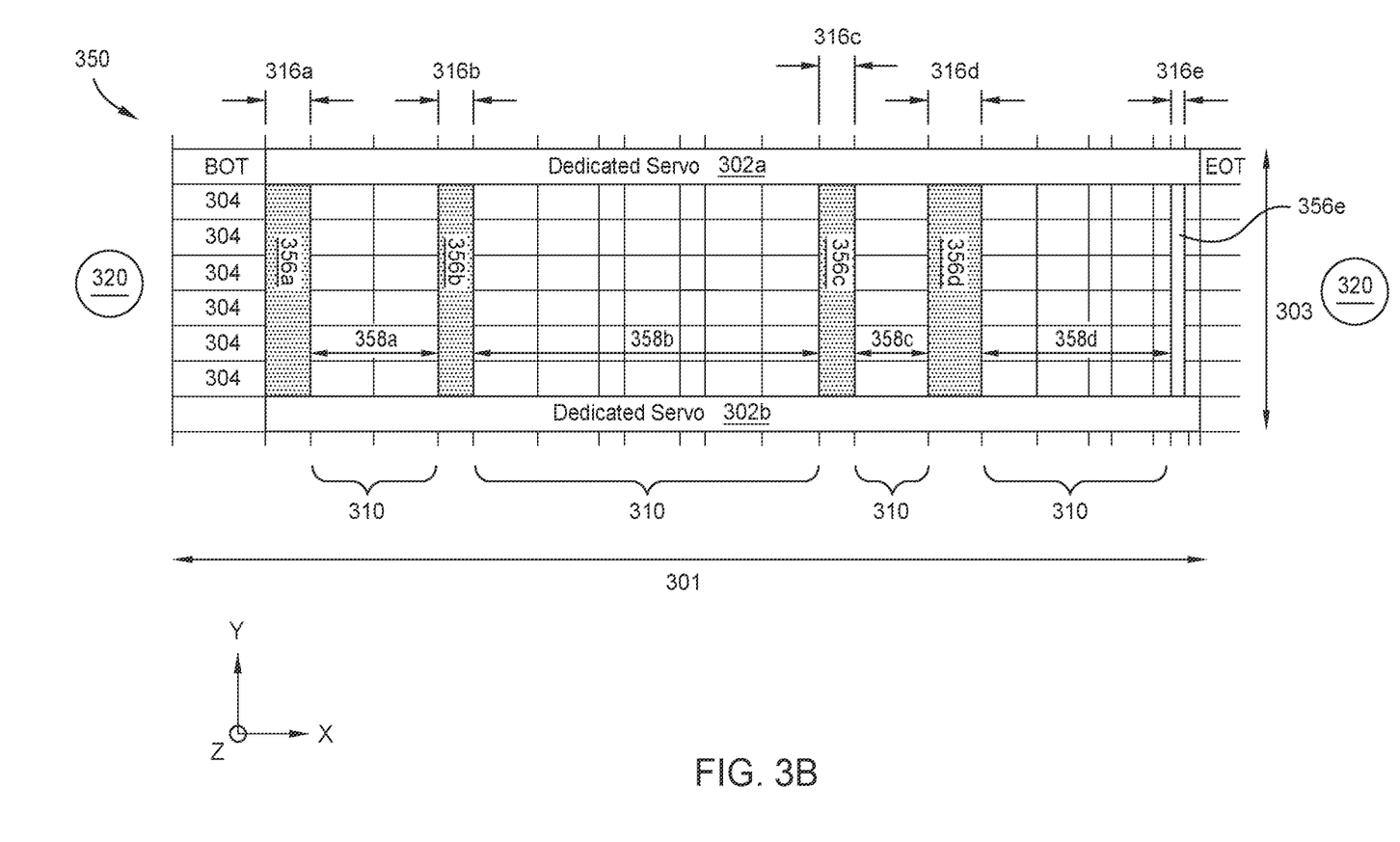

FIGS. 3A-3B illustrate magnetic tapes 300, 350 for use with a tape head of a tape drive, according to various embodiments. Each of the magnetic tapes 300, 350 may be the tape 204 of FIG. 2, and may be utilized with a tape head module assembly, such as the tape head module assembly 200 of FIG. 2, or a tape drive, such as the tape drive 100 of FIG. 1. The tape drive utilized with the tapes 300, 350 may be an ultra-high areal data density tape drive. As such, aspects of FIG. 2 may be referred to in the description of FIGS. 3A-3B.

Each tape 300, 350 has a length 301 in the x-direction of about 500 m to about 1200 m, and a width 303 in the y-direction of about 1 cm to about 5 cm. As such, it is noted that FIGS. 3A-3B are not to scale. Furthermore, while two embodiments of magnetic tapes 300, 350 are shown in FIGS. 3A-3B, aspects shown in only one of the magnetic tapes 300, 350 may apply to both magnetic tapes 300, 350, and as such, elements of the magnetic tapes 300, 350 may be used in combination.

Each tape 300, 350 comprises one or more dedicated servo tracks 302a, 302b and a plurality of data tracks 304. The dedicated servo tracks 302a, 302b may collectively be referred to herein as servo tracks 302. It is to be understood that while two servo tracks 302a, 302b are shown in each of FIGS. 3A-3B, the disclosure is not limited to two servo tracks 302. Rather, the number of servo tracks 302 can be more or less than two, depending on the requirements of the embodiment. Similarly, the number of data tracks 304 is not intended to be limiting, and a greater or fewer number of data tracks 304 than shown may be used.

In each tape 300, 350, sections of data tracks 304 are grouped together in a plurality of writeable portions 310 or writeable zones. Tape heads, such as the tape head module assembly 200 of FIG. 2, are able to write data to and read data from the writeable portions 310. Each tape 300, 350 may be coupled to reels 320 of a tape drive. Each writeable portion 310 extends in the y-direction from the first servo tracks 302a to the second servo track 302b. During formation of each tape 300, 350, the plurality of writeable portions 310 are sputtered with a first coating comprising one or more materials selected from the group consisting of: Ru, Pt, Ta, Co, Ni, Fe, W, Cr, Ti, and Zr. The writeable portions 310 comprising such precious metals enable the tapes 300, 350 to be utilized with ultra-high areal data density tape drives.

In the magnetic tape 300 of FIG. 3A, a plurality of non-writeable portions 306a-306d or non-writeable zones are disposed between each writeable portion 310. Thus, each non-writeable portion 306a-306d is disposed adjacent to and in contact with at least one writeable portion 310. The plurality of non-writeable portions 306a-306d may collectively be referred to as the non-writeable portions 306. The writeable portions 310 and the non-writeable portions 306 alternate down the length 301 of the tape 300, or alternate down at least a portion of the tape 300. User data is unable to be stored in the non-writeable portions 306. In some embodiments, the non-writeable portions 306 may support writing of embedded servo patterns, which have a lower linear density as compared to the ultra-high areal density of the writeable portions 310. As such, the dedicated servo tracks 302a, 302b may be written partially on both the writeable portions 310 and the non-writeable portions 306.

Each non-writeable portion 306 is sputtered with a second coating comprising one or more materials selected from the group of W, Be, Ti, Ta, Cr, and Si, among others. As such, the writeable portions 310 and the non-writeable portions 306 comprise different materials. The material of the non-writeable portions 306 may be selected based on a number of factors, such as surface lubrication, surface roughness, high or enhanced thermal and mechanical properties or mechanical strength, improve moisture barrier to a base film material of the tape 300, an ability to reduce wear of the tape 300, an ability to improve tape dimensional stability (TDS) (e.g., preventing the tape 300 from expanding or contracting), an ability to absorb TDS effects, an ability to mitigate stop-start stiction effects, and an ability to absorb stiction. The plurality of non-writeable portions 306 have different mechanical properties than the plurality of writeable portions 310 to mitigate tape dimensional stability issues or changes in the plurality of writeable portions 310. For example, the non-writeable portions 306 are more rigid than the writeable portions 310, the non-writeable portions 306 have a higher mechanical stability than the writeable portions 310, the non-writeable portions 306 have lower coefficients of thermal and humidity expansion and/or contraction than the writeable portions 310, and the writeable portions 310 are more elastic than the non-writeable portions 306. The elastic properties of both the writeable portions 310 and the non-writeable portions 306 may be selected to enhance the mechanical stability of writeable portions 310.

The non-writeable portions 306 physically support the writeable portions 310 at the junction between the two types of sections and when wound into a tape pack on either reel 320. The non-writeable portions 306 physically supporting the writeable portions 310 mitigates any expansion or contraction of the writeable portions 310 due to the viscoelastic nature of the writeable portions 310 by enhancing the rigidity and mechanical stability of the non-writeable portions 306 and by reducing any humidity induced dimensional changes of the writeable portions 310. Moreover, the surface characteristics of the non-writeable portions 306 portions are selected such that these non-writeable portions 306 mitigate or absorb stiction effects when the tape 300 motion is stopped, and the tape 300 is held in tension stationary on a recording head.

In the magnetic tape 300, each non-writeable portion 306 has a same longitudinal length 314 in the x-direction of about 10 cm to about 1 m, and each writeable portion 310 has a same longitudinal length 308 in the x-direction of about 2 m to about 12 m. Thus, the writeable portions 310 have a greater area than the non-writeable portions 306. The non-writeable portions 306 and the writeable portions 310 may have a same length 303 in the y-direction. Each writeable portion 310 is defined between two non-writeable portions 306 in the x-direction. A thickness in the z-direction of the writeable portions 310, or the coating of the writeable portions 310, ranges from about 20 nm to about 60 nm, and a thickness in the z-direction of the non-writeable portions 306, or a coating of the non-writeable portions 306, ranges from about 20 nm to about 100 nm.

In the embodiment shown in FIG. 3A, the non-writeable portions 306 are spaced equidistance apart (i.e., by the length 308 of a writeable portion 310). However, in other embodiments, the non-writeable portions 306 may be spaced apart by varying distances, similar to as shown in FIG. 3B. The length 308 of the writeable portions 310 may vary, resulting in one or more writeable portions 310 being different sizes. In some embodiments, a customer may choose the length 308 of each writeable portion 310.

The length 314 of each non-writeable portion 306 is based on one or more of: dimensions of the magnetic tape 300, a density of the magnetic tape 300, a tension of the magnetic tape 300, the length 308 of each of the writeable portions 310, a tape 300 stop-start or turn-around operation efficiency of a tape drive, head-tape friction, tape velocity over the tape head, and a specified number of passes required by the tape drive, among others. The mechanical characteristics of the non-writeable portions 306 are selected to have significant resistance to dimensional changes caused by temperature, pressure, humidity, and tension (among other effects). The magnetic tape 300 may comprise any number of non-writeable portions 306, such as about 5 non-writeable portions 306 to about 100 non-writeable portions 306. In some embodiments, a first non-writeable portion 306a disposed at a beginning of the tape 300 (BOT) is attached to a first reel 320, and a second non-writeable portion 306d disposed at an end of the tape 300 (EOT) is attached to a second reel 320. In such embodiments, the non-writeable portions 306b, 306c disposed inwards from the beginning and end of the tape 300 are disposed adjacent to and in contact with two writeable portions 310.

The magnetic tape 350 of FIG. 3B is similar to the magnetic tape 300 of FIG. 3A in that a plurality of non-writeable portions 356a-356e or non-writeable zones are disposed between each writeable portion 310, where each non-writeable portion 356a-356e is disposed adjacent to and in contact with at least one writeable portion 310. The plurality of non-writeable portions 356a-356e may collectively be referred to as the non-writeable portions 356. The writeable portions 310 and the non-writeable portions 356 alternate down the length 301 of the tape 350, or alternate down at least a portion of the tape 350. User data is unable to be stored in the non-writeable portions 356; however, servo data could be stored in the non-writeable portions 356. As such, the dedicated servo tracks 302a, 302b may be written partially on both the writeable portions 310 and the non-writeable portions 356. Each non-writeable portion 356 is coated or sputtered with a second coating comprising one or more materials selected from the group consisting of W, Be, Ti, Ta, Cr, and Si, among others. As such, the writeable portions 310 and the non-writeable portions 356 comprise different materials.

The material of the non-writeable portions 356 may be selected based on a number of factors, such as surface lubrication, surface roughness, high or enhanced thermal and mechanical properties or mechanical strength, improve moisture barrier to a base film material of the tape 350, an ability to reduce wear of the tape 350, an ability to improve TDS (e.g., preventing the tape 350 from expanding or contracting), an ability to or absorb TDS effects, an ability to mitigate stop-start stiction effects, and an ability to absorb stiction. The plurality of non-writeable portions 356 have different mechanical properties than the plurality of writeable portions 310 to mitigate tape dimensional stability issues or changes in the plurality of writeable portions 310. For example, the non-writeable portions 356 are more rigid than the writeable portions 310, the non-writeable portions 356 have a higher mechanical stability than the writeable portions 310, the non-writeable portions 356 have lower coefficients of thermal and humidity expansion and/or contraction than the writeable portions 310, and the writeable portions 310 are more elastic than the non-writeable portions 356. The elastic properties of both the writeable portions 310 and the non-writeable portions 356 may be selected to enhance the mechanical stability of writeable portions 310.

The non-writeable portions 356 physically support the writeable portions 310 at the junction between the two types of sections and when wound into a tape pack on either reel 320. The non-writeable portions 356 physically supporting the writeable portions 310 mitigates any expansion or contraction of the writeable portions 310 due to the viscoelastic nature of the writeable portions 310 by enhancing the rigidity and mechanical stability of the non-writeable portions 356 and by reducing any humidity induced dimensional changes of the writeable portions 310. Moreover, the surface characteristics of the non-writeable portions 356 portions are selected such that these non-writeable portions 356 mitigate or absorb stiction effects when the tape 350 motion is stopped, and the tape 350 is held in tension stationary on a recording head.

The magnetic tape 350 differs from the magnetic tape 300 in that at least two non-writeable portions 356a, 356b have a different longitudinal lengths 316a, 316b. Each non-writeable portion 356 has a length in the x-direction of about 10 cm to about 1 m. In the embodiment shown in FIG. 3B, each non-writeable portion 356a, 356b, 356c, 356d, and 356e has a different length 316a, 316b, 316c, 316d, and 316e in the x-direction. For example, the fifth non-writeable portion 356e shown has a smaller length 316e than each of the first through fourth non-writeable portions 356a-356d, and the fourth non-writeable portion 306d has a greater length 316d than each of the first, second, third, and fifth non-writeable portions 356a, 356b, 356c, 356e. However, one or more non-writeable portions 356 may have a same length in the x-direction, similar to as shown in FIG. 3A.

Similarly, at least two writeable portions 310 have different lengths 358a, 358b in the x-direction. Each writeable portion 310 has a length 358a-358d in the y-direction of about 2 m to about 12 m. In some embodiments, the non-writeable portions 356 extend over the first servo track 302a and the second servo track 302b in the y-direction, like shown in FIG. 3A. Each writeable portion 310 is defined between two non-writeable portions 306 in the x-direction. A thickness in the z-direction of the writeable portions 310, or the coating of the writeable portions 310, ranges from about 20 nm to about 60 nm, and a thickness in the z-direction of the non-writeable portions 356, or a coating of the non-writeable portions 356, ranges from about 20 nm to about 100 nm.

In the embodiment shown in FIG. 3B, each writeable portion 310 has a different length 358a, 358b, 358c, 358d in the x-direction. However, one or more writeable portions 310 may have a same length in the x-direction, similar to as shown in FIG. 3A. Because each writeable portion 310 has a different length 358a-358d in the x-direction in the magnetic tape 350, the non-writeable portions 356 are spaced apart by varying distances. In other embodiments, the non-writeable portions 356 may have different lengths 358a-358d in the x-direction while each writeable portion 310 has a same length in the x-direction, in which the non-writeable portions 356 would be spaced equidistance apart. In some embodiments, a customer may choose the length 358a-358d of each writeable portion 310.

The non-writeable portions 356 and the writeable portions 310 may have a same width 303 in the y-direction. Thus, the writeable portions 310 have a greater area than the non-writeable portions 356. The length 314 of each non-writeable portion 356 is based on one or more of: dimensions of the magnetic tape 350, a density of the magnetic tape 350, a tension of the magnetic tape 350, the length 308 of each of the writeable portions 310, a tape 350 stop-start or turn-around operation efficiency of a tape drive, head-tape friction, tape velocity over the tape head, and a specified number of passes required by the tape drive, among others. The mechanical characteristics of the non-writeable portions 356 are selected to have significant resistance to dimensional changes caused by temperature, pressure, humidity, and tension (among other effects).

The magnetic tape 350 may comprise any number of non-writeable portions 356, such as about 5 non-writeable portions 356 to about 100 non-writeable portions 356. In some embodiments, a first non-writeable portion 356a disposed at a beginning of the tape 350 is attached to a first reel 320, and a second non-writeable portion 356e disposed at an end of the tape 350 is attached to a second reel 320. In such embodiments, the non-writeable portions 356b-306d disposed inwards from the beginning and end of the tape 350 are disposed adjacent to and in contact with two writeable portions 310. Additionally, the first non-writeable portion 356a attached to the first reel 320 and the second non-writeable portion 356e attached to the second reel 320 may have a greater length 316a, 316e than the non-writeable portions 356b-306d disposed inwards from the beginning and end of the tape 350.

Both the non-writeable portions 306 of FIG. 3A and the non-writeable portions 356 of FIG. 3B can provide several additional benefits to a tape drive, such as adding lubrication to a tape head during turn-around operations, cleaning the tape head, and removing debris from the tape head and/or the writeable portions 310 of the tape 300, 350. Additionally, in the absence of a conventional cleaning tape being usable or available, such as in TEDs, the non-writeable portions 306, 356 can act to remove smearing and other surface contaminates collected on a tape head during normal operation, which helps enable ultra-high areal data densities. Moreover, because the non-writeable portions 306, 356 comprise a different material than the writeable portions 310

(i.e., the non-writeable portions 306, 356 do not comprise one or more of Ru, Pt, Ta, and Co), the overall cost of the tape 300, 350 can be reduced, as precious metal materials used in the writeable portions 310 are generally expensive.

The non-writeable portions 306, 356 may further be utilized as "parking zones" for a tape head, where the tape 300, 350 can be stopped when the tape head is in contact with the non-writeable portions 306, 356, rather than in contact with the writeable portions 310. In embodiments utilizing a TED system, the tape media 300, 350 is never removed from the drive—unlike for example an LTO tape drive. While it is feasible to retract the tape head from being in contact with the tape 300, 350 in this type of tape drive, retracting the tape 300, 350 adds complexity and cost while also increasing possible tape drive failure mechanisms, thereby decreasing the overall system reliability. If the tape head is left in contact with any of the writeable portions 310 of the tape 300, 350, there is a significantly increased propensity for the tape head to stick to the tape 300, 350 due to the extremely smooth nature of both the writeable portions 310 of the tape 300, 350 and the tape head, which is necessary to reduce the head-tape separation thereby enabling increased areal densities.

When the tape motion is re-initiated, the tape head sticking to the tape 300, 350 significantly increases the chance of the tape movement damaging the tape 300, 350 which is in contact with the tape head. Thus, the tape head can be parked in contact with the tape 300, 350 in one of the plurality of non-writeable portions 306, 356, which can be rougher and have different surface properties than the writeable portions 310. Parking the tape 300, 350 in a non-writeable portion 306, 356 mitigates any potential stiction issues on start-up, and completely overcomes the possibility of the tape head damaging the writeable portions 310 when parked between tape drive operations, as the material and surface characteristics of the non-writeable portions 306, 356 are selected to mitigate head-tape stiction when the tape 300, 350 is held in tension and stationary against the recording head.

Figure 4A:
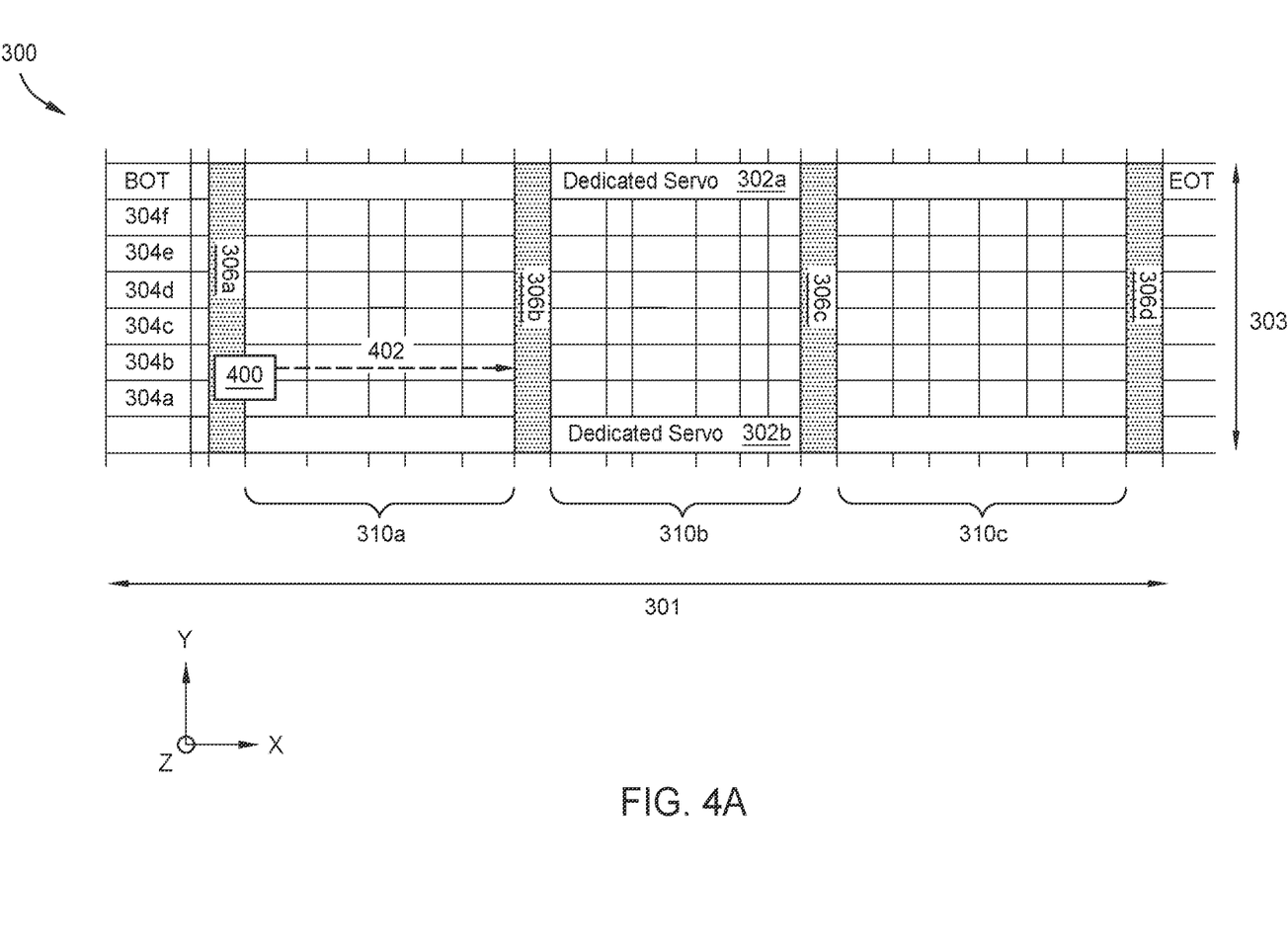
FIGS. 4A-4C illustrate a tape head of a tape drive writing to the magnetic media of FIG. 3A, according to one embodiment.
Figure 4B:
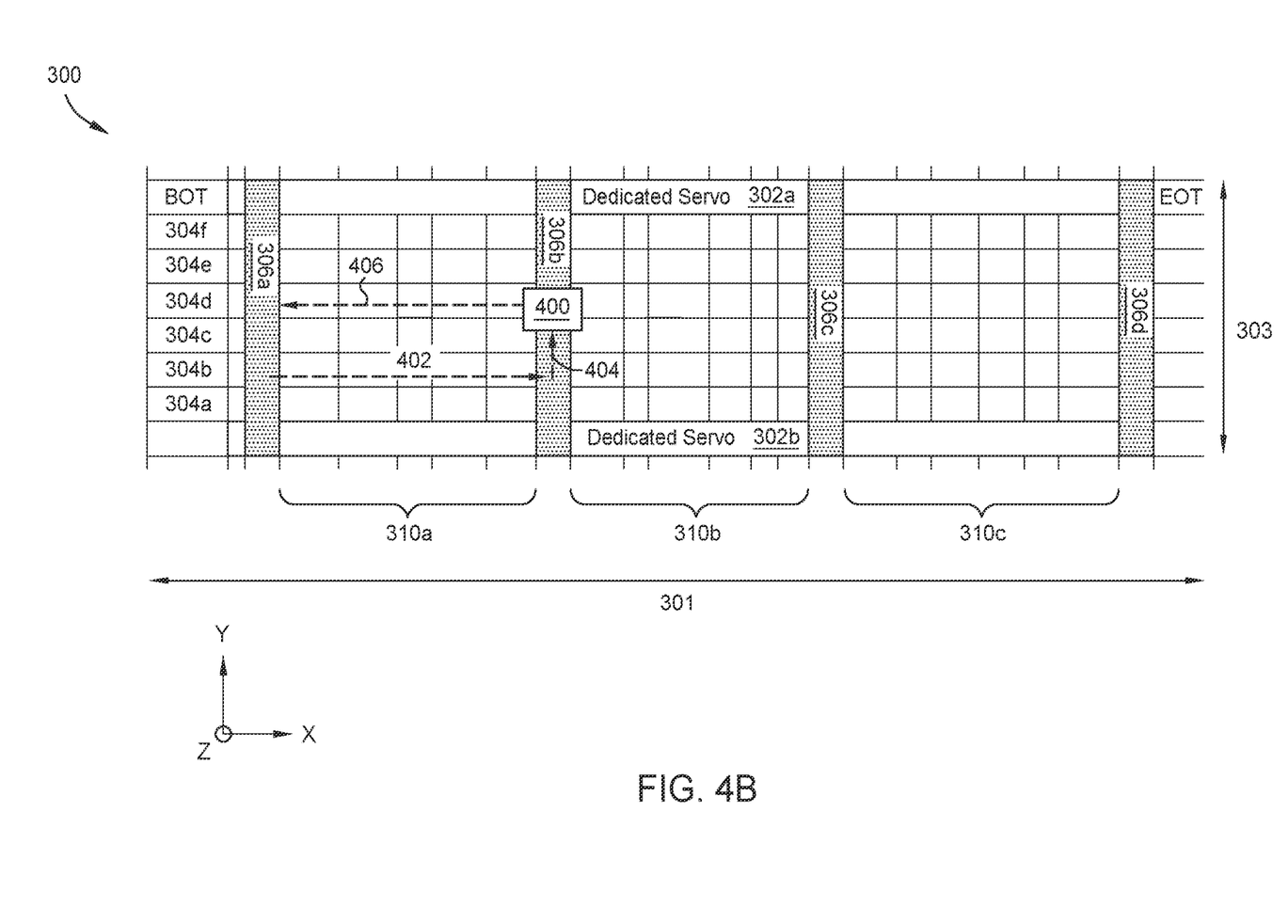
Figure 4C:
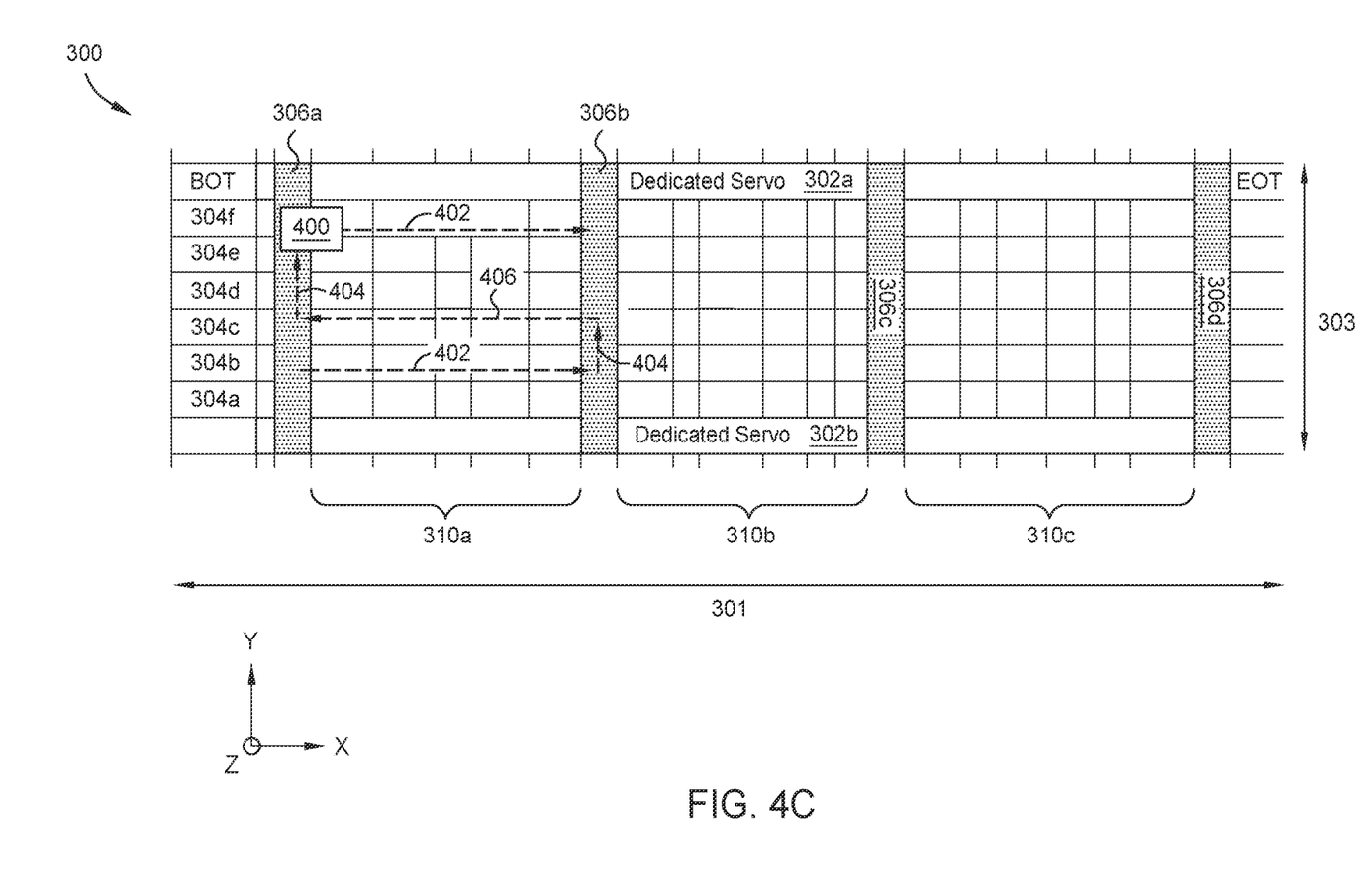

FIGS. 4A-4C illustrate a tape head 400 of a tape drive writing to the magnetic tape 300 of FIG. 3A in a start-stop or turn-around operation, according to one embodiment. While FIGS. 4A-4C refer back to the tape 300 of FIG. 3A, the tape 350 of FIG. 3B may be utilized with the tape head 400 of FIGS. 4A-4C in the same manner. Additionally, FIGS. 4A-4C are not drawn to scale, but are intended merely to illustrate a start-stop or turn-around operation.

The tape head 400 may be the tape head module assembly 200 of FIG. 2 within a tape drive, such as the tape drive 100 of FIG. 1. The tape drive comprising the tape head 400 may be an ultra-high areal data density tape drive. While not shown, the tape head 400 comprises one or more write heads and one or more read heads, such as the plurality of data heads 208A-208G of FIG. 2. The tape 300 comprises the plurality of writeable portions 310a-310c, the plurality of non-writeable portions 306 (or the plurality of non-writeable portions 356 of FIG. 3B), and the dedicated servo tracks 302. While six data tracks 304a-304f are shown in FIGS. 4A-4C, the tape 300 may comprise a greater or lesser number of data tracks 304a-304f, and the number of data tracks 304a-304f is not intended to be limiting.

FIG. 4A illustrates the tape 300 moving in a first direction 402 (e.g., the x-direction) such that the tape head 400 moves over the tape 300 from a first non-writeable portion 306a to write data to at least a portion of a first data track 304a and at least a portion of a second data track 304b of a first writable portion 310a. Upon reaching a second non-writeable portion 306b in FIG. 4B, the tape 300 stops and moves in a second direction 404 (e.g., the y-direction) along the second non-writeable portion 306b such that the tape head 400 moves over the tape 300 in the second direction 404. The tape 300 then starts and turns around to move in a third direction 406 (e.g., the −x-direction) such that the tape head 400 moves over the tape 300 from the second non-writeable portion 306b to write data to at least a portion of a third data track 304c and at least a portion of a fourth data track 304d of the first writable portion 310a.

Upon reaching the first non-writeable portion 306a in FIG. 4C, the tape 300 stops and moves in the second direction 404 (e.g., the y-direction) such that the tape head 400 moves over the tape 300 along the first non-writeable portion 306a. The tape 300 then starts again and turns around to move in the first direction 402 (e.g., the x-direction) such that the tape head 400 moves over the tape 300 from the first non-writeable portion 306a to write data to at least a portion of a fifth data track 304e and at least a portion of a sixth data track 304f of the first writable portion 310a until the tape head 400 reaches the second non-writeable portion 306b once again. Thus, as shown in FIGS. 4A-4C, the tape head 400 moves over the tape 300 in a serpentine fashion between adjacent non-writeable portions 306a, 306b to write data to a writeable portion 310a disposed between the adjacent non-writeable portions 306a, 306b.

The tape 300 and tape head 400 continue moving in such a serpentine manner in the first, second, and third directions 402, 404, 406 between the adjacent non-writeable portions 306a, 306b until each data track 304 in the first writeable portion 310a is storing data. Upon writing data to each data track 304 in the first writable portion 310a, the tape 300 may then move such that the tape head 400 is disposed over or near the second writeable portion 310b to begin the serpentine writing process over again on the second writeable portion 310b.

While the tape head 400 is shown and described as writing to two data tracks 304 at a time, the tape head 400 may write to any number of data tracks 304 at a time (e.g., when writing in the first direction 402 and in the second direction 406), or only a portion of a data track 304. For example, depending on the number of write heads the tape drive comprises, the tape head 400 writes N tracks on each pass where N is the number of parallel channel (e.g., 16, 32, 64, etc.) in the tape drive. The tape head 400 is then moved, the tape direction is reversed, and the next set of N tracks is written until a non-writeable portion 306 is reached. The tape 300 is then stopped again, the tape direction is reversed, and the next set of N tracks is written adjacent to the previously written set of N tracks. Thus, the data tracks 304 being written need not be adjacent to one another. The tape head 400 may write to at least a portion of a first, third, and fifth data track when writing in the first direction the first time, and then write to at least a portion of a second, fourth, and sixth data track when writing in the second direction 406 the first time. As such, the exemplary embodiment described in FIGS. 4A-4C is not intended to be limiting, but for exemplary purposes only to show the tape head 400 writing in a serpentine fashion to a writeable portion 310a.

To compare to conventional methods of writing data to a tape that does not comprise non-writeable portions 306, a tape head would start at the beginning of the tape, similar to shown in FIG. 4A, but would continue writing data to data tracks along an entire length 301 of the tape until reaching the end of the tape. Writing data to a conventional tape in such a manner thus makes finding desired data more difficult, as more data must first be read by a tape head before reaching the desired data. As a result, the tape head is more susceptible to wear.

Because data is written to a smaller area of the tape 300, 350 (i.e., the first writeable portion 310a) as compared to conventional tapes (i.e., one or more data tracks extending from a beginning of the tape the end of the tape), the data within a writeable portion 310 can be accessed and read quicker and more efficiently compared to data stored on conventional tapes. Being able to access and read desired data from the tape 300, 350 quicker and more efficiently further results in reduced power budget for tape drives in seek operations for reading and/or writing data and reduced wear on the tape head, whereas conventional tapes must read more data before reaching the desired data. The overall performance of a tape drive utilizing the tape 300, 350 is further increased, as data may be found, updated, replaced, and/or erased faster due to the data being confined in the writeable portions 310.

Therefore, by utilizing a tape comprising one or more non-writeable portions and a plurality of writeable portions, the life of the tape can be prolonged, as the tape is less susceptible to damage during turn-around operations of a tape head of a tape drive and during parking of the tape head, while the overall cost of the tape is reduced and the performance of the tape drive in increased. Furthermore, the non-writeable portions may add lubrication to the tape head during turn-around operations, clean the tape head, and remove debris from the tape head and/or the writeable portions 310 of the tape 300, 350. As such, utilizing the tape comprising one or more non-writeable portions and a plurality of writeable portions reduces wear of the tape and tape head while improving TDS.

In one embodiment, a magnetic tape comprises a plurality of writeable portions comprising one or more materials selected from the group consisting of: Ru, Pt, Ta, Co, Ni, Fe, W, Cr, Ti, and Zr, the plurality of writeable portions being able to store data, and a plurality of non-writeable portions, each non-writeable portion being disposed adjacent to at least one writeable portion of the plurality of writeable portions, wherein the plurality of non-writeable portions and the plurality of writeable portions comprise different materials.

The plurality of writeable portions are sputtered with a first coating comprising the one or more materials selected from the group consisting of: Ru, Pt, Ta, Co, Ni, Fe, W, Cr, Ti, and Zr. The plurality of non-writeable portions are sputtered with a second coating comprising one or more materials selected from the group consisting of W, Be, Ti, Ta, Cr, and Si. Each of the plurality of non-writeable portions have a length of about 10 cm to about 1 m, and each writeable portion of the plurality of writeable portions have a length of about 2 m to about 12 m. The plurality of non-writeable portions and the plurality of writeable portions are alternating along a total length of the magnetic tape. The plurality of non-writeable portions and the plurality of writeable portions are alternating along at least a portion of the magnetic tape.

A magnetic tape drive comprises the magnetic tape, and a tape head configured to write data to and read data from the plurality of writeable portions. The plurality of non-writeable portions are unable to store user data. The plurality of non-writeable portions are able to store embedded servo data. A first non-writeable portion of the plurality of non-writeable portions is disposed at a beginning of the magnetic tape, and a second non-writeable portion of the plurality of non-writeable portions is disposed at the end of the magnetic tape. The first non-writeable portion is configured to be attached to a first reel in the tape drive, and the second non-writeable portion is configured to be attached to a second reel in the tape drive.

In another embodiment, a magnetic tape comprises a plurality of writeable portions comprising one or more materials selected from the group consisting of: Ru, Pt, Ta, Co, Ni, Fe, W, Cr, Ti, and Zr, the plurality of writeable portions being able to store data, wherein each writeable portion of the plurality of writeable portions has a first area, and a plurality of non-writeable portions, each non-writeable portion being disposed in contact with at least one writeable portion of the plurality of writeable portions, wherein: the plurality of non-writeable portions each has a second area, the first area is greater than the second area, and the plurality of non-writeable portions and the plurality of writeable portions comprise different materials.

The plurality of writeable portions are sputtered with a first coating comprising the one or more materials selected from the group consisting of: Ru, Pt, Ta, Co, Ni, Fe, W, Cr, Ti, and Zr. The plurality of non-writeable portions are sputtered with a second coating comprising one or more materials selected from the group consisting of W, Be, Ti, Ta, Cr, and Si. The plurality of writeable portions and the plurality of non-writeable portions alternate along a total length of the magnetic tape. Each writeable portion of the plurality of writeable portions is defined between two non-writeable portions of the plurality of non-writeable portions. Each of the plurality of non-writeable portions have a length of about 10 cm to about 1 m. Each writeable portion of the plurality of writeable portions have a length of about 2 m to about 12 m. The plurality of non-writeable portions are about 5 non-writeable portions to about 100 non-writeable portions. At least two of the non-writeable portions of the plurality of non-writeable portions have different lengths. At least two writeable portions of the plurality of writeable portions have different lengths.

The plurality of non-writeable portions are configured to mitigate tape dimensional stability issues or changes in the plurality of writeable portions of the magnetic tape. Mechanical properties of both the plurality of non-writeable portions and the plurality of writeable portions are selected such that a balance of elasticities and coefficients of expansion and contraction with temperature and humidity are configured to mitigate tape dimensional stability. A magnetic tape drive comprises the magnetic tape, and a tape head configured to write data to and read data from the plurality of writeable portions, wherein the plurality of non-writeable portions are unable to store user data.

In yet another embodiment, a magnetic tape comprises a plurality of writeable portions sputtered with a first coating comprising one or more materials selected from the group consisting of: Ru, Pt, Ta, Co, Ni, Fe, W, Cr, Ti, and Zr, the plurality of writeable portions being able to store data, and a plurality of non-writeable portions sputtered with a second coating comprising one or more materials selected from the group consisting of W, Be, Ti, Ta, Cr, and Si, wherein: the first coating and the second coating comprise different materials, the plurality of writeable portions and the plurality of non-writeable portions alternate along a total length of the magnetic tape, and the plurality of non-writeable portions are unable to store user data.

Each writeable portion of the plurality of writeable portions is defined between two non-writeable portions of the plurality of non-writeable portions. Each writeable portion of the plurality of writeable portions have a greater area than each of the one or more non-writeable portions. A magnetic tape drive comprises the magnetic tape, and a tape head configured to write data to and read data from the plurality of writeable portions. The plurality of non-writeable portions have different mechanical properties than the plurality of writeable portions. The plurality of non-writeable portions are configured to lubricate the tape head, clean the tape head, remove debris from the tape head, and to mitigate tape dimensional stability issues or changes in the plurality of writeable portions of the magnetic tape.

While the foregoing is directed to embodiments of the present disclosure, other and further embodiments of the disclosure may be devised without departing from the basic scope thereof, and the scope thereof is determined by the claims that follow.

What is claimed is:

1. A magnetic tape, comprising:
a plurality of writeable portions comprising one or more materials selected from the group consisting of: Ru, Pt, Ta, Co, Ni, Fe, W, Cr, Ti, and Zr, the plurality of writeable portions being able to store data; and
a plurality of non-writeable portions, each non-writeable portion being disposed adjacent to at least one writeable portion of the plurality of writeable portions, wherein the plurality of non-writeable portions and the plurality of writeable portions comprise different materials, and wherein the plurality of non-writeable portions comprise one or more materials selected from the group consisting of: W, Be, Ti, Ta, and Si, the plurality of non-writeable portions being more rigid and having a higher mechanical stability than the plurality of writeable portions.

2. The magnetic tape of claim 1, wherein the plurality of writeable portions are sputtered with a first coating comprising the one or more materials selected from the group consisting of: Ru, Pt, Ta, Co, Ni, Fe, W, Cr, Ti, and Zr.

3. The magnetic tape of claim 2, wherein the plurality of non-writeable portions are coated with a second coating comprising one or more materials selected from the group consisting of: W, Be, Ti, Ta, and Si.

4. The magnetic tape of claim 1, wherein each of the plurality of non-writeable portions have a length of about 10 cm to about 1 m, and wherein each writeable portion of the plurality of writeable portions have a length of about 2 m to about 12 m.

5. The magnetic tape of claim 1, wherein the plurality of non-writeable portions and the plurality of writeable portions are alternating along a total length of the magnetic tape.

6. The magnetic tape of claim 1, wherein the plurality of non-writeable portions and the plurality of writeable portions are alternating along at least a portion of the magnetic tape.

7. A magnetic tape drive, comprising:
the magnetic tape of claim 1; and
a tape head configured to write data to and read data from the plurality of writeable portions, wherein the plurality of non-writeable portions are unable to store user data.

8. The magnetic tape drive of claim 7, wherein a first non-writeable portion of the plurality of non-writeable portions is disposed at a beginning of the magnetic tape, and a second non-writeable portion of the plurality of non-writeable portions is disposed at the end of the magnetic tape.

9. The magnetic tape drive of claim 8, wherein the first non-writeable portion is configured to be attached to a first reel in the tape drive, and the second non-writeable portion is configured to be attached to a second reel in the tape drive.

10. The magnetic tape of claim 8, wherein the plurality of non-writeable portions are able to store embedded servo data.

11. A magnetic tape, comprising:
a plurality of writeable portions comprising one or more materials selected from the group consisting of: Ru, Pt, Ta, Co, Ni, Fe, W, Cr, Ti, and Zr, the plurality of writeable portions being able to store data, wherein each writeable portion of the plurality of writeable portions has a first area; and
a plurality of non-writeable portions, each non-writeable portion being disposed in contact with at least one writeable portion of the plurality of writeable portions, wherein:
the plurality of non-writeable portions each has a second area,
the first area is greater than the second area,
the plurality of non-writeable portions and the plurality of writeable portions comprise different materials,
the plurality of non-writeable portions comprise one or more materials selected from the group consisting of: W, Be, Ti, Ta, and Si, and
the plurality of non-writeable portions are more rigid and have a higher mechanical stability than the plurality of writeable portions.

12. The magnetic tape of claim 11, wherein the plurality of writeable portions are sputtered with a first coating comprising the one or more materials selected from the group consisting of: Ru, Pt, Ta, Co, Ni, Fe, W, Cr, Ti, and Zr, and wherein the plurality of non-writeable portions are sputtered with a second coating comprising one or more materials selected from the group consisting of W, Be, Ti, Ta, and Si.

13. The magnetic tape of claim 11, wherein the plurality of writeable portions and the plurality of non-writeable portions alternate along a total length of the magnetic tape, and wherein each writeable portion of the plurality of writeable portions is defined between two non-writeable portions of the plurality of non-writeable portions.

14. The magnetic tape of claim 11, wherein each of the plurality of non-writeable portions have a length of about 10 cm to about 1 m, and wherein each writeable portion of the plurality of writeable portions have a length of about 2 m to about 12 m.

15. The magnetic tape of claim 11, wherein the plurality of non-writeable portions are about 5 non-writeable portions to about 100 non-writeable portions.

16. The magnetic tape of claim 15, wherein at least two of the non-writeable portions of the plurality of non-writeable portions have different lengths.

17. The magnetic tape of claim 11, wherein at least two writeable portions of the plurality of writeable portions have different lengths.

18. The magnetic tape of claim 11, wherein the plurality of non-writeable portions are configured to mitigate tape dimensional stability issues or changes in the plurality of writeable portions of the magnetic tape, and wherein mechanical properties of both the plurality of non-writeable portions and the plurality of writeable portions are selected such that a balance of elasticities and coefficients of expansion and contraction with temperature and humidity are configured to mitigate tape dimensional stability.

19. A magnetic tape drive, comprising:
the magnetic tape of claim 11; and
a tape head configured to write data to and read data from the plurality of writeable portions, wherein the plurality of non-writeable portions are unable to store user data.

20. A magnetic tape, comprising:
a plurality of writeable portions sputtered with a first coating comprising one or more materials selected from the group consisting of: Ru, Pt, Ta, Co, Ni, Fe, W, Cr, Ti, and Zr, the plurality of writeable portions being able to store data; and
a plurality of non-writeable portions sputtered with a second coating comprising one or more materials selected from the group consisting of W, Be, Ti, Ta, and Si, wherein:
the first coating and the second coating comprise different materials,
the plurality of writeable portions and the plurality of non-writeable portions alternate along a total length of the magnetic tape,
the plurality of non-writeable portions are unable to store user data, and
the plurality of non-writeable portions are more rigid and have a higher mechanical stability than the plurality of writeable portions.

21. The magnetic tape of claim 20, wherein each writeable portion of the plurality of writeable portions is defined between two non-writeable portions of the plurality of non-writeable portions, wherein each writeable portion of the plurality of writeable portions have a greater area than each of the one or more non-writeable portions, and wherein the plurality of non-writeable portions have different mechanical properties than the plurality of writeable portions.

22. A magnetic tape drive, comprising:
the magnetic tape of claim 20; and
a tape head configured to write data to and read data from the plurality of writeable portions.

23. The magnetic tape drive of claim 22, wherein the plurality of non-writeable portions are configured to lubricate the tape head, clean the tape head, remove debris from the tape head, and to mitigate tape dimensional stability issues or changes in the plurality of writeable portions of the magnetic tape.

24. The magnetic tape drive of claim 7, wherein the tape head is controllable to write data to and read data from the plurality of writeable portions in a serpentine manner between adjacent non-writeable portions of the plurality of non-writeable portions.

25. The magnetic tape drive of claim 24, wherein the tape head is controllable to:
(a) move in a first direction from a first non-writeable portion of the plurality of non-writeable portions across a first writeable portion of the plurality of writeable portions to write data to and read data from the first writeable portion;
(b) upon reaching a second non-writeable portion of the plurality of non-writeable portions, move in a second direction perpendicular to the first direction;
(c) move in a third direction anti-parallel to the first direction across the first writeable portion to write data to and read data from the first writeable portion;
(d) upon reaching the first non-writeable portion, move in the second direction; and
(e) repeat (a)-(d) one or more times.

26. The magnetic tape drive of claim 19, wherein the tape head is controllable to write data to and read data from the plurality of writeable portions in a serpentine manner between adjacent non-writeable portions of the plurality of non-writeable portions.

27. The magnetic tape drive of claim 22, wherein the tape head is controllable to write data to and read data from the plurality of writeable portions in a serpentine manner between adjacent non-writeable portions of the plurality of non-writeable portions.

* * * * *